Figure 1:
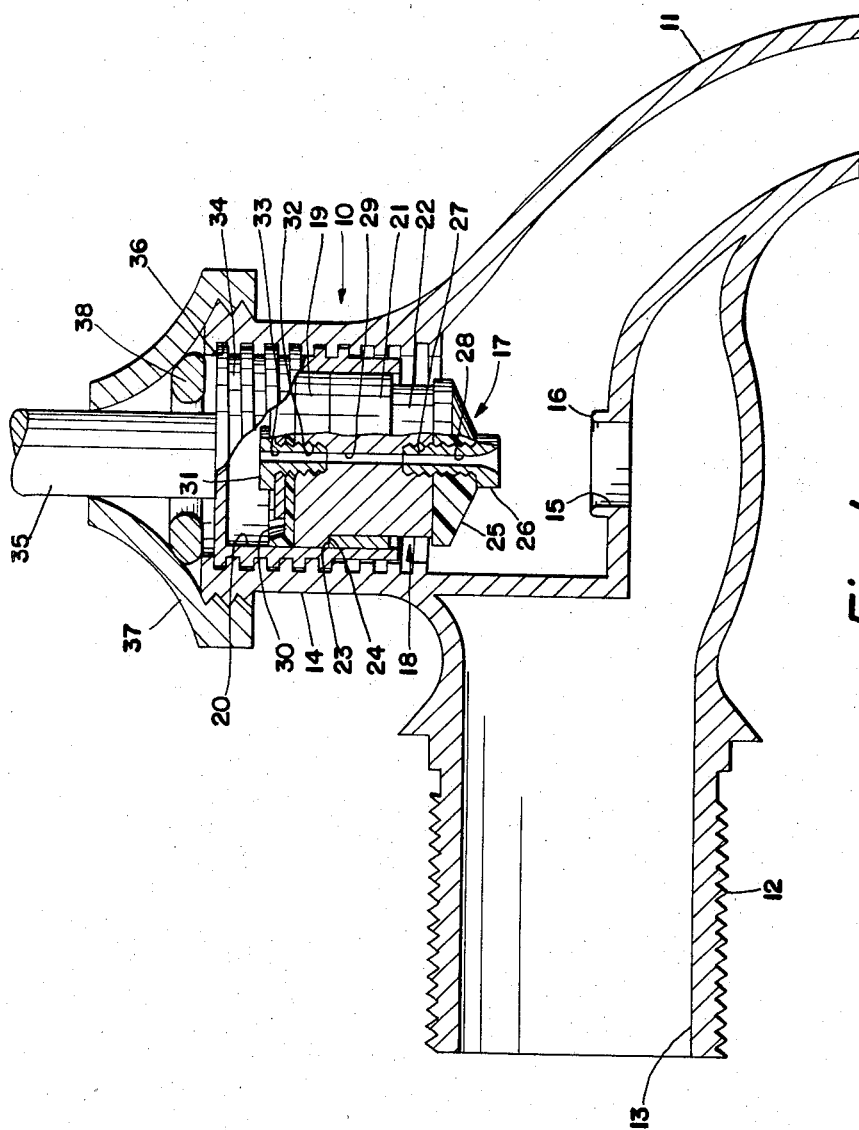

INVENTOR.
STEPHEN A. GRUBER

INVENTOR.
STEPHEN A. GRUBER ns Patent Office
3,377,048
Patented Apr. 9, 1968

3,377,048
FLUID BIASED FLOW CONTROL MEANS
Stephen A. Gruber, 1352 E. 82nd St.,
Cleveland, Ohio 44103
Filed Dec. 23, 1965, Ser. No. 515,924
3 Claims. (Cl. 251—175)

This invention relates to flow control means and, more particularly, to a closure member for selectively opening and closing the outlet opening of a fluid flow control valve.

According to this invention, a valve closure member may be advanced toward the outlet opening of a valve casing so that the closure member may engage the valve seat without the usual scoring between the valve seat and the valve closure member. The closure member according to this invention may comprise a piston which is mounted within a cylinder so that the piston has a preselected stroke within the cylinder. The cylinder may be advanced or retracted toward the outlet opening of the valve along an axis normal to the outlet opening. Means are provided to supply line pressure in the cylinder behind the piston so that the piston is urged toward the outlet opening when the closure member is brought into engagement with the valve seat and so that the outlet opening will remain closed as the cylinder moves along a path which is substantially equal in length to the stroke of the piston. Thus, a substantially constant pressure is exerted by the closure member on the valve seat even though the cylinder is advanced past its sealing position with respect to the outlet opening of the valve. This arrangement minimizes unnecessary pressure and surface-to-surface scoring between the closure member and its valve seat as the closure member is advanced past its effective sealing position.

It is, therefore, a principal object of the present invention to provide an improved closure member and closure member advancing means for a valve which effectively seals the outlet opening of the valve while minimizing unnecessary scoring and surface-to-surface frictional contact between the closure member and its valve seat.

It is a further object of this invention to provide an improved closure member and closure member advancing means which may be included in standard valves without expensive modifications to such valves.

These and other objects and advantages of the invention will become apparent from the following description and accompanying drawings.

Figure 2:
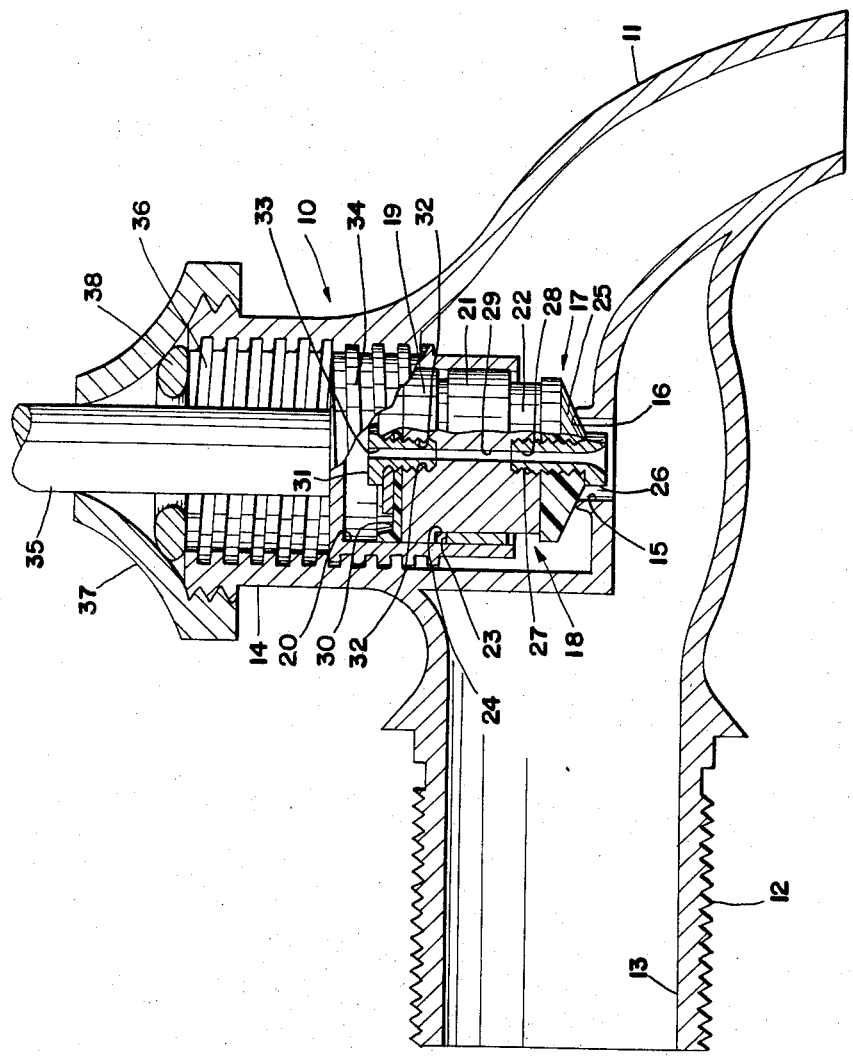

In the drawings:

FIG. 1 is a longitudinal, cross sectional view, with portions broken away for clarity, of a valve embodying the present invention, showing the valve in an open condition; and FIG. 2 is a longitudinal, cross sectional view, with portions broken away for clarity, of a valve embodying the present invention, showing the valve in a closed condition.

Referring now to the drawings, a valve body 10 is illustrated. The body 10 may comprise a faucet-type valve or any other type valve employed for controlling fluid flow. The body 10 includes a spigot 11, a threaded inlet portion 12 having an inlet passageway 13 therein, a stem housing 14, and an inlet opening 15 which is defined by an annular valve seat 16.

A closure member 17 is provided and the closure member 17 comprises a piston 18 having an enlarged cylindrical end portion 19 which is slidably mounted in a cylinder 20. A detent means which comprises a cylindrical ring 21 is fixed within the lower end of the cylinder 20 and is retained therein by an interference fit between its outer side wall and the side wall of the cylinder. The inner surface of the ring 21 slidably receives a reduced cylindrical lower end portion 22 of the piston 18. An upper edge 23 of the ring 21 serves as an abutment for an annular shoulder 24 which is formed at the juncture between the portions 19 and 22 of the cylinder 18 to thereby limit and define the stroke of the piston within the cylinder 20.

The lower end of the portion 22 of the piston 18 is provided with a sealing member 25 which may comprise a neoprene washer adapted to engage the annular valve seat 16. The sealing member 25 is attached to the lower end of the piston 18 by a screw 26. The screw 26 engages a threaded counterbore 27 in the piston 18. The screw 26 is provided with a central passageway 28 which communicates with an axial bore 29 in the piston 18.

The upper end of the piston 18 is provided with a piston seal 30, which may be Teflon or some other suitable sealing material. The seal 30 is fixed to the top of the piston 18 by a screw 31 which engages a threaded counterbore 32 in the piston 18. The screw 31 is provided with a central passageway 33 which communicates with the axial bore 29 in the piston 18.

The cylinder 20 is defined by an enlarged threaded portion 34 of a valve stem 35. The portion 34 is threadedly received by threads 36 formed in the portion 14 of the body 10. The valve stem 35 is guided by a bonnet 37 which is threaded onto the upper end of the portion 14 and a suitable seal 38 is provided between the bonnet 37 and the stem 35.

The valve closure member 17 may be advanced toward the valve seat 16 by threading the portion 34 into the body 10. Since a passageway is provided through the piston 18, the fluid pressure exerted on the sealing member 25 equals the pressure in the cylinder 20 behind the piston 18. The piston 18, therefore, tends to remain in the position illustrated in FIG. 1 as the valve stem 35 and its enlarged portion 34 are moved downwardly.

When the sealing member 25 engages the valve seat 16 to thereby close the outlet opening 15, the force exerted by the fluid in the cylinder 20 above the piston 18 exceeds the force exerted on the sealing member 25 which is exposed to the outlet opening 15, since the face area of the piston 18 exposed to the pressure in the cylinder 20 is greater than the face area of the sealing member 25 which is exposed to the substantially equal line pressure. The net force is, therefore, in a downward direction as viewed in the drawings to effect a seal at the outlet opening 15.

If, after the sealing member 25 establishes its sealing contact with the valve seat 16, the valve stem is further rotated, such rotation will not affect the established force between the sealing member 25 and its seat 16. Any further advancement of the valve stem 35 and its threaded portion 34 merely causes the cylinder 20 to slide downwardly relative to the piston 18 and such sliding motion does not impart any substantial axial force to the piston 18. Thus, the sealing member 25 may be seated with a predetermined force (dependent upon the relative cross sectional areas of the piston 20 and the outlet opening 15 and the line pressure) without any significant sliding contact between the sealing element 25 and its valve seat 16. In the embodiment illustrated, such overtravel of the valve stem ensures that an effective seal has been established. In valves that do not employ threads to impart axial movement of the valve stem (such as valves employing solenoid and cam actuated valve stems) the overtravel permitted by the arrangement according to this invention ensures an effective seal and minimizes the need for a precise predetermination of valve stem travel.

The sealing element 15 may be unseated by unscrewing the valve stem 35 relative to the body 10 so that the top portion 23 of the ring 21 engages the annular shoulder 23 of the piston 18. Further rotation of the valve stem 35 lifts the sealing element 25 from its seat 16.

In light of the above teachings, many modifications and variations of the invention will become apparent to those skilled in the art. It is to be understood, therefore, that within the scope of the appended claims, the invention may be practiced otherwise than as specifically disclosed.

What is claimed is:

1. In a fluid flow control valve having an outlet opening comprising a valve seat and a closure member for selectively opening and closing the outlet opening, in combination therewith the improvement comprising means for moving said closure member along an axis normal to the outlet opening, said means comprising a cylinder, said closure member comprising a piston having one end slidably mounted in said cylinder and having sealing means at its opposite end adapted to engage and seal said outlet opening, detent means carried by said cylinder limiting the travel of said piston out of said cylinder by engaging a portion of said piston so that the piston has a preselected stroke within said cylinder, means defining an opening through said piston so that the fluid pressure exerted on the piston face within said cylinder corresponds to the pressure exerted on the sealing end of the piston, said piston face having a greater area than the area defined by said outlet opening so that the sealing means is retained in its closed position by the force exerted on the piston face, so that the outlet opening will remain closed as the cylinder moves along a path substantially equal in length to the stroke of the piston, and so that the sealing means may be moved to an open position when said detent means engages said portion of the piston.

2. The improvement according to claim 1 wherein said cylinder is defined by a valve stem which threadedly engages a portion of the valve and is moved along said axis by said threaded engagement.

3. The improvement according to claim 1 wherein said detent means comprises a cylindrical ring fixed within said cylinder and wherein said piston has a relatively large upper portion slidingly engaging the cylinder wall, a relatively small lower portion slidingly engaging said ring, and has an annular shoulder portion between said upper and lower portions which engages an upper end of the ring.

References Cited

UNITED STATES PATENTS

| | | | |
|---|---|---|---|
| 3,043,554 | 7/1962 | De la Garza | 251—175 |
| 3,081,062 | 3/1963 | Dumm | 251—175 |

FOREIGN PATENTS 750,181 6/1956 Great Britain.

CLARENCE R. GORDON, *Primary Examiner.*